(12) United States Patent
Zheng et al.

(10) Patent No.: US 9,182,086 B2
(45) Date of Patent: Nov. 10, 2015

(54) DIFFUSING PLATE STRUCTURE AND BACKLIGHT MODULE

(71) Applicant: TPV Display Technology (Xiamen) Co., Ltd., Xiamen (CN)

(72) Inventors: Junyi Zheng, Xiamen (CN); Po-Iem Lin, Xiamen (CN); Chih-Ming Wang, Xiamen (CN); Her-Dong Shih, Xiamen (CN)

(73) Assignee: TPV Display Technology (Xiamen) Co., Ltd., Xiamen (CN)

( * ) Notice: Subject to any disclaimer, the term of this patent is extended or adjusted under 35 U.S.C. 154(b) by 144 days.

(21) Appl. No.: 14/165,823

(22) Filed: Jan. 28, 2014

(65) Prior Publication Data

US 2014/0307418 A1    Oct. 16, 2014

(30) Foreign Application Priority Data

Apr. 16, 2013    (CN) .......................... 2013 1 0131400

(51) Int. Cl.
*F21V 7/04*     (2006.01)
*F21K 99/00*    (2010.01)
*G02B 5/02*     (2006.01)

(52) U.S. Cl.
CPC ............. *F21K 9/50* (2013.01); *G02B 5/0236* (2013.01); *G02B 5/0278* (2013.01)

(58) Field of Classification Search
CPC .... G02B 6/0036; G02B 6/0061; G02B 6/005; G02B 6/0043; G02B 6/0018; G02B 6/0058; G02B 1/10; G02B 6/004

USPC .......................................................... 362/618
See application file for complete search history.

(56) References Cited

U.S. PATENT DOCUMENTS

2012/0169791 A1 *  7/2012  Whitehead et al. ........... 345/690

FOREIGN PATENT DOCUMENTS

CN        102767786 A    11/2012

* cited by examiner

*Primary Examiner* — William Carter
(74) *Attorney, Agent, or Firm* — Alan D. Kamrath; Kamrath IP Lawfirm, P.A.

(57) ABSTRACT

The invention relates to a diffusing plate structure and a backlight module. The diffusing plate structure is corresponding to a light source and comprises an incidence surface, an emergence surface, a side surface, and a light diffusing structure. The incidence surface is opposite to the emergence surface. The light diffusing structure is disposed on at least one of the incidence surface and the emergence surface, and includes a plurality of unit blocks distributed evenly. Every unit block includes a first micro diffusing structure or a second micro diffusing structure. The first micro diffusing structure includes a first transparent area for transmitting light and a first opaque area for reflecting and diffusing light. The first opaque area surrounds the first transparent area. The second micro diffusing structure includes a second transparent area for transmitting light and a second opaque area for reflecting and diffusing light. The second transparent area surrounds the second opaque area.

14 Claims, 11 Drawing Sheets

FIG.4

DIFFUSING PLATE STRUCTURE AND BACKLIGHT MODULE

BACKGROUND OF THE INVENTION

1. Field of the Invention

The present invention relates to a diffusing plate structure, and more particularly, to a diffusing plate structure applied to a backlight module.

2. Description of the Prior Art

Generally, the liquid crystal module utilized in the flat display device adopts the technique of thin film transistor liquid crystal display (TFT-LCD). The lighting mechanism of TFT-LCD is inactive. The brightness that the TFT-LCD needs is provided by a backlight module. Then a colorful image that the TFT-LCD displays is achieved by the filtration of a color filter which filters the light provided by the backlight module.

A conventional direct type backlight module includes a light source and an optical film set. The light source usually adopts light emitting diode (LED). LED becomes one of the most popular light sources that utilizes in the backlight module of TFT-LCD because of smaller size and less energy consuming. When the LEDs are utilized in the backlight module, the LEDs are arranged as a matrix. If light rays respectively emitted from the LEDs in the matrix do not fitly couple with each other, the brightness that the LEDs provide will be uneven. In order to ensure that the backlight module can provide an even brightness distribution, one way is to increase more optical films, and the other way is to add a micro structure disposed on the optical film.

According to a patent of china named "Diffusion plate with dot-matrix diffusion structures and backlight module utilizing same" of which application number is CN201210257025.0, a diffusion plate with dot-matrix diffusion structures have been disclosed. The dot-matrix diffusion structures are disposed on an emergence surface or an incidence surface of the diffusion plate. Centers of the diffusion structures are respectively corresponding to centers of the light sources. The diffusion structure includes two types. The first type is that the diffusion plate includes a circle portion located on a centric area thereof. The circle portion includes hollow spots arranged as a concentric annular. Outside of the centric area of the diffusion plate includes solid spots arranged as a concentric annular. The diffusion structures are applied over the areas with the solid spots and the areas without hollow spots. The second type is that the diffusion plate includes an annular portion disposed on a centric area thereof and arranged as concentric. Outside of the centric area of the diffusion plate includes solid spots arranged as a concentric annular. The diffusion structures are applied over the annular portion and the areas with the solid spots. Although the first and the second types of the diffusion structures mostly overcome the shortage of the uneven brightness distribution phenomenon caused by the conventional LED matrix, light spots emitted from every two adjacent LEDs are still interfered with each other to partially cause that the distribution of the brightness is not symmetry respectively relative to the LEDs.

SUMMARY OF THE INVENTION

According to shortages of the prior art, the present invention aims to provide a diffusing plate structure having more adjustability and convenience with regard to automatic design of light diffusing structures. The diffusing plate structure is easy to be inspected, and can be applied to a backlight module.

According to the claimed invention, an embodiment of the diffusing plate structure is disclosed. The diffusing plate structure is corresponding to a light source and comprises an incidence surface, an emergence surface, a side surface, and a light diffusing structure. The incidence surface is opposite to the emergence surface. The light source is adjacent to a side of the incidence surface. The light diffusing structure is disposed on at least one of the incidence surface and the emergence surface, has rotational symmetry relative to the light source, and includes a plurality of unit blocks distributed evenly. Every unit block includes a first micro diffusing structure or a second micro diffusing structure. Wherein the first micro diffusing structure includes a first transparent area for transmitting light and a first opaque area for reflecting and diffusing light, the first opaque area surrounds the first transparent area, the second micro diffusing structure includes a second transparent area for transmitting light and a second opaque area for reflecting and diffusing light, and the second transparent area surrounds the second opaque area.

According to the embodiment of the invention, a density of the unit block is d, an area of the unit block is S, and a predetermined threshold is f where $0 < f \leq 1$. Wherein when d is greater than f, the first micro diffusing structure is disposed on the unit block, an area of the first transparent area is S1, and $d = (S - S1)/S$. When d is less than f, the second micro diffusing structure is disposed on the unit block, an area of the second opaque area is S2, and $d = S2/S$.

According to structures aforementioned, the light diffusing structure is disposed on the incidence surface or the emergence surface, has rotational symmetry relative to the light source, and includes the unit blocks distributed evenly. The unit block includes the first micro diffusing structure or the second micro diffusing structure. The diffusing plate structure has more convenience with regard to automatic design. The first and the second micro diffusing structures make the distribution of light rays provided by the backlight module become more evenly and improve the adjustability of the light diffusing structure.

The light diffusing structure can be formed on the incidence surface or the emergence surface of the diffusing plate structure by means of optical printing or injection molding. The light diffusing structure is capable of reflecting and diffusing. In general, a reflective index of the light diffusing structure is greater than 10%. Light rays passing through and reflected by the light diffusing structure are remixed. The backlight module applied with the diffusing plate structure has better distribution of light rays.

According to the claimed invention, another embodiment of the diffusing plate structure is disclosed. The diffusing plate structure is corresponding to a light source and comprises an incidence surface, an emergence surface, a side surface, and a light diffusing structure. The incidence surface is opposite to the emergence surface. The light source is adjacent to a side of the incidence surface. The light diffusing structure is disposed on at least one of the incidence surface and the emergence surface, and includes a plurality of unit blocks distributed evenly. Every unit block includes a first micro diffusing structure or a second micro diffusing structure. Wherein the first micro diffusing structure includes a first transparent area for transmitting light and a first opaque area for reflecting and diffusing light, the first opaque area surrounds the first transparent area, the second micro diffusing structure includes a second transparent area for transmitting light and a second opaque area for reflecting and diffusing light, and the second transparent area surrounds the second opaque area. Wherein the light diffusing structure is an asymmetry structure and distributed in a manner according to following steps:

1) deriving an initial matrix with regard to an initial brightness distribution image recorded by a camera when the light source illuminates the diffusing plate structure;
2) defining a target matrix with regard to a target brightness distribution image;
3) deriving a density distribution matrix with regard to the light diffusing structure according to the initial matrix and the target matrix;
4) defining d representing a density of the unit block, S representing an area of the unit block, f representing a predetermined threshold, and $0<f\leq1$, wherein when d is greater than f, the first micro diffusing structure is disposed on the unit block, an area of the first transparent area is S1, and $d=(S-S1)/S$; when d is less than f, the second micro diffusing structure is disposed on the unit block, an area of the second opaque area is S2, and $d=S2/S$; and
5) patterning the first and the second micro diffusing structures by combining the density distribution matrix in accordance with step 3 and settings with regard to the first and the second micro diffusing structures in accordance with step 4.

According to structures aforementioned and considering a reflective index of the light diffusing structure disposed on the diffusing plate structure. The first micro diffusing structure having relatively greater density is disposed on an area having relatively higher initial brightness with regard to the initial brightness distribution image, and the second micro diffusing structure having relatively less density is disposed on an area having relatively lower initial brightness. A tendency of the density distribution of the first or the second micro diffusing structure is in accordance with a tendency of the initial brightness distribution.

According to structures aforementioned, the light diffusing structure is an asymmetry structure. The light diffusing structures respectively disposed on different areas are designed in accordance with the initial brightness distribution. The light diffusing structures have more adjustability and are beneficial to uniformity of brightness distribution.

According to the embodiment of the invention, the predetermined threshold f is 0.5 which is beneficial to automatic design and fabrication of the light diffusing structure.

According to the embodiment of the invention, the unit blocks are adjacent to each other.

According to the embodiment of the invention, a shape of the unit block is square, rectangular, triangle, parallelogram, trapezoid, or hexagon.

According to the embodiment of the invention, a material of the diffusing plate structure is polyethylene terephthalate (PET), polycarbonate (PC), polymethyl acrylate (PMAA), polystyrene (PS), or acrylic.

According to the embodiment of the invention, a thickness of the diffusing plate structure is 0.5-3 mm, a transmittance of the diffusing plate structure is 40-80%, and a haze of the diffusing plate structure is greater than 60%.

According to the claimed invention, a backlight module applied with the diffusing plate structure aforementioned is disclosed. The backlight module comprises a containing device, a reflecting device, a lighting device, and at least one optical film. The reflecting device, the lighting device, and the optical film are positioned in the containing device. The lighting device locates between the reflecting device and the optical film. The diffusing plate structure is adjacent to the optical film. The containing device is also utilized for containing other components of the backlight module. The reflecting device is utilized for reflecting and reusing light rays which are projected to the periphery and the bottom of the containing device. The lighting device is arranged as a matrix or a staggered pattern. The lighting device can be arranged with an optical lens to increase the ability of light diffusing. The optical film can be a diffusing plate or a prism plate to increase the brightness of the backlight module and the uniformity of light mixing. The light diffusing structure can be further disposed on any kind of optical films to increase the brightness of the backlight module and the uniformity of light mixing.

The diffusing plate structure and the backlight module of the present invention are beneficial to distribution of brightness by means of the light diffusing structure which is disposed on at least one of the incidence surface and the emergence surface of the diffusing plate structure and is capable of diffusing, reflecting, and remixing light rays. The light diffusing structure disposed on the diffusing plate structure of the present invention can be automatically designed and can be easily processed. The light diffusing structure is an asymmetry structure; therefore, the density of unit blocks can be partially adjusted according to the uneven brightness distribution phenomenon so as to make the brightness distribution more even.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a diagram of a density distribution matrix of a light diffusing structure according to the first embodiment of the present invention.

DETAILED DESCRIPTION

Figure 1:
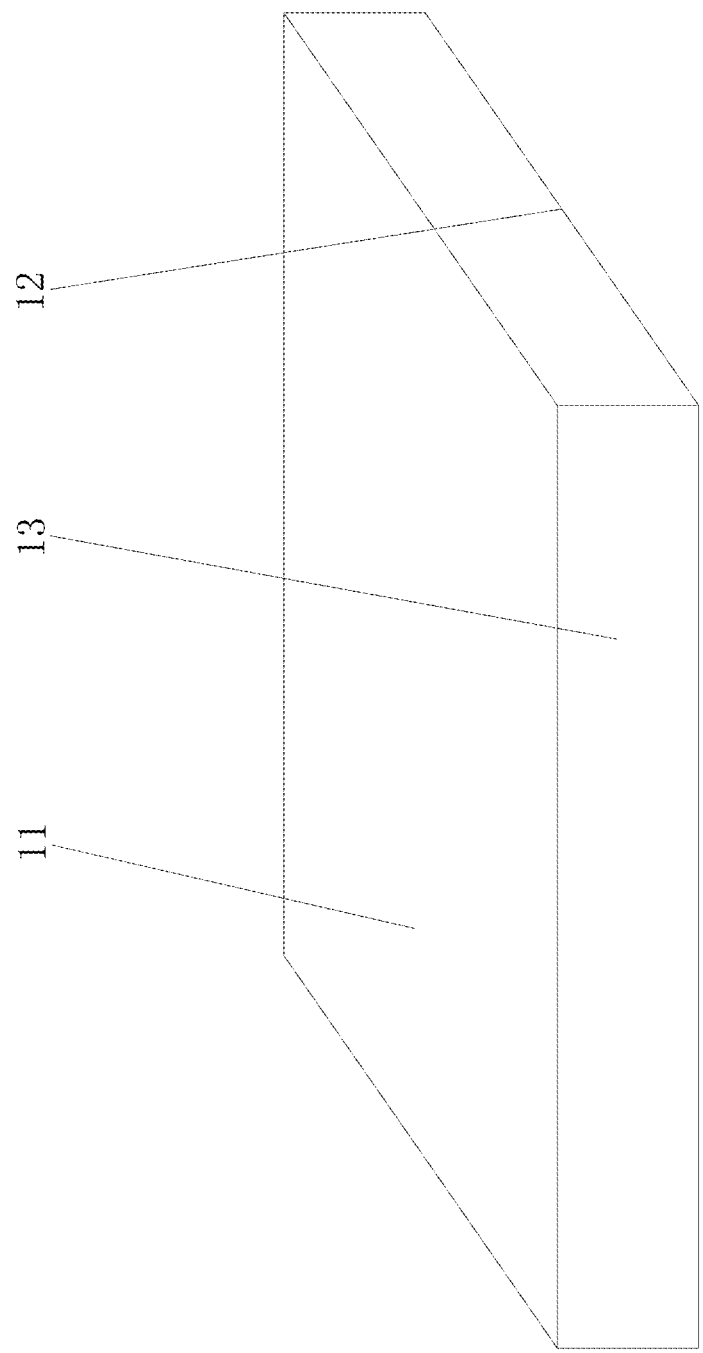
FIG. 1 is a diagram of a diffusing plate structure according to a first embodiment of the present invention.
Figure 2:
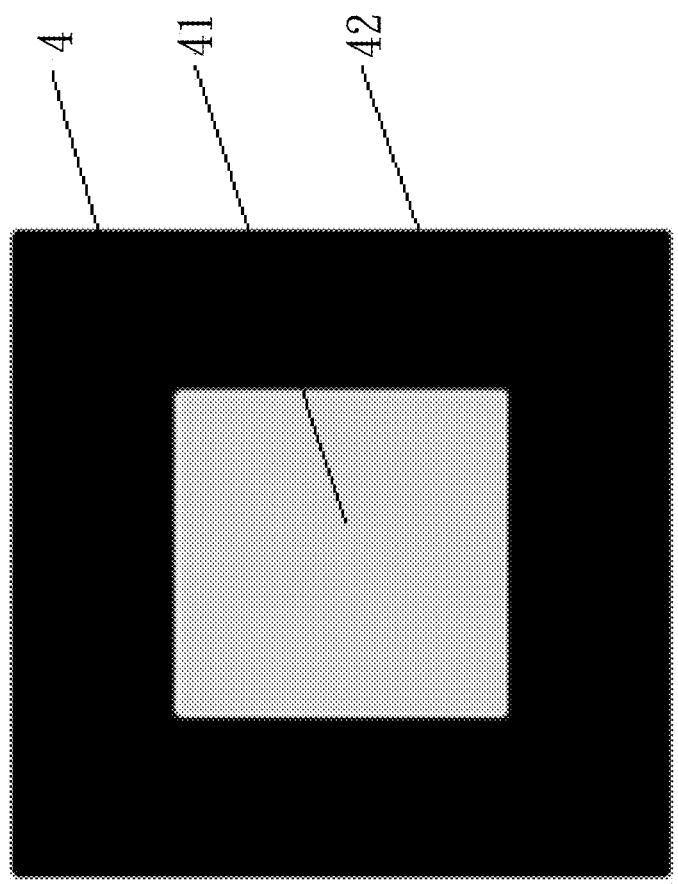
FIG. 2 is a diagram of a first micro diffusing structure.
Figure 3:
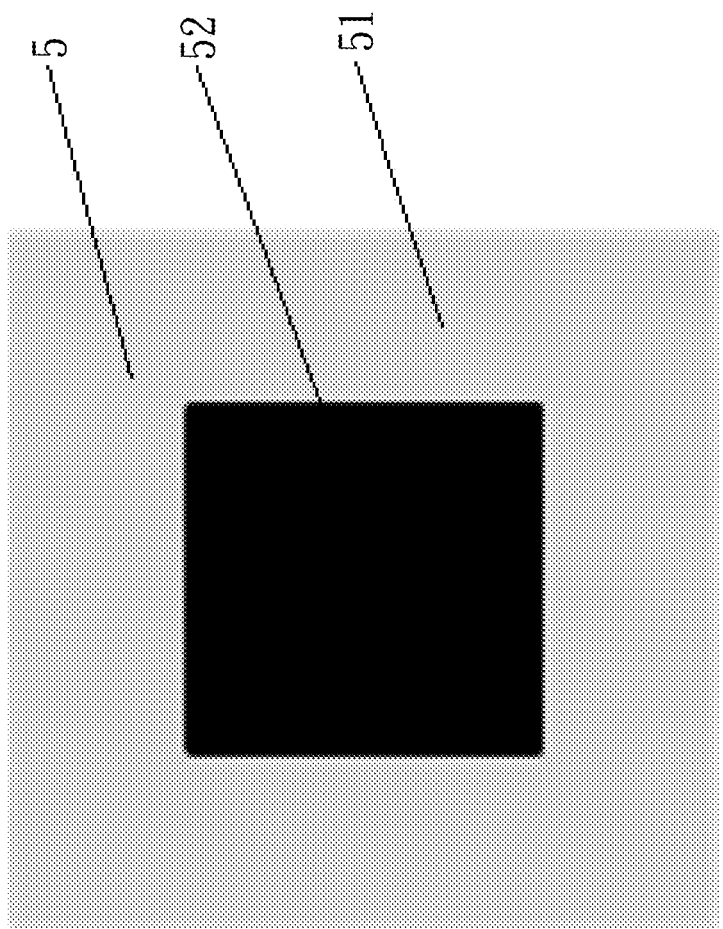
FIG. 3 is a diagram of a second micro diffusing structure.
Figure 5:
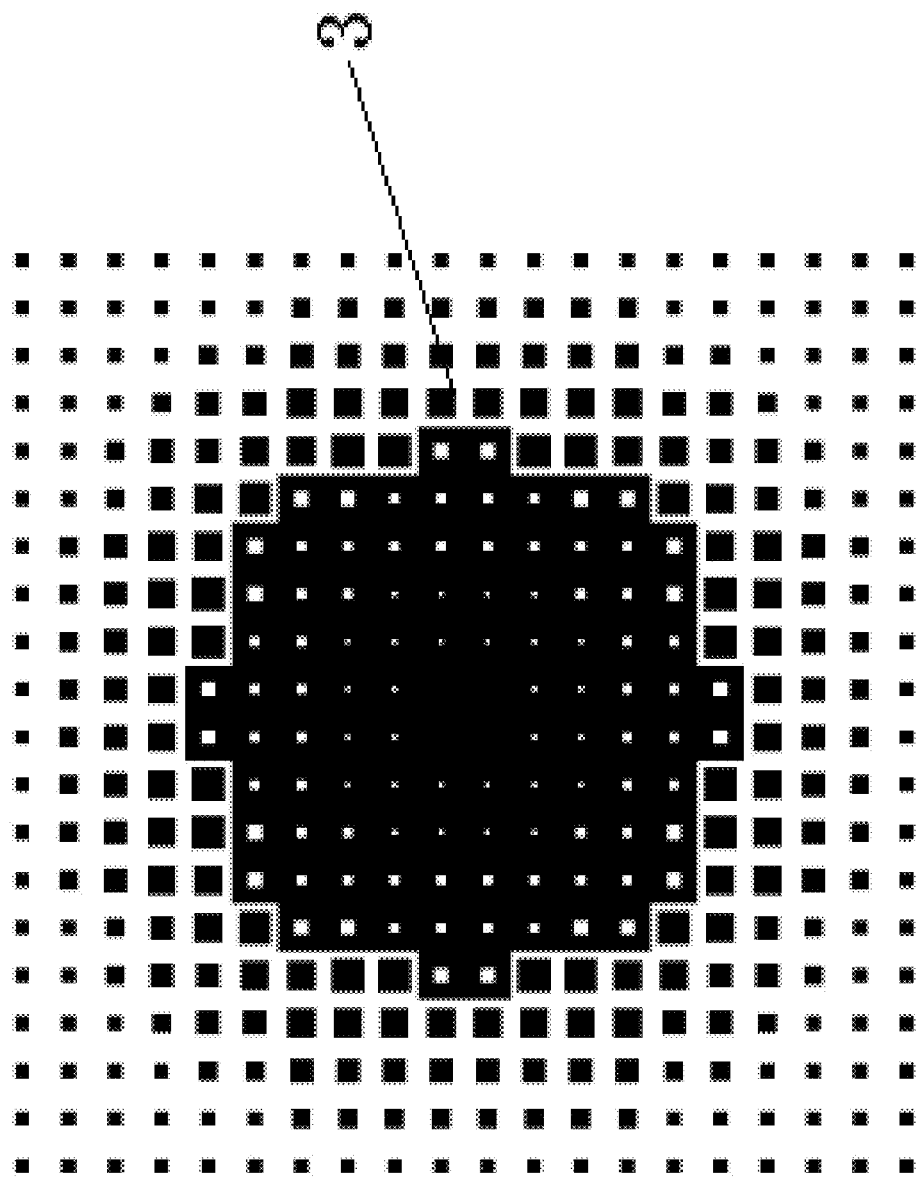
FIG. 5 is a diagram of a light diffusing structure of which a predetermined threshold is 0.5.
Figure 7:
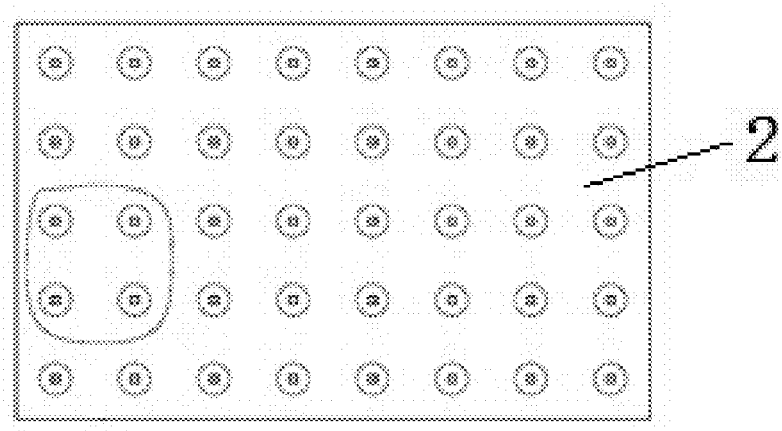
FIG. 7 is a diagram of light sources arranged as a matrix.
Figure 11:
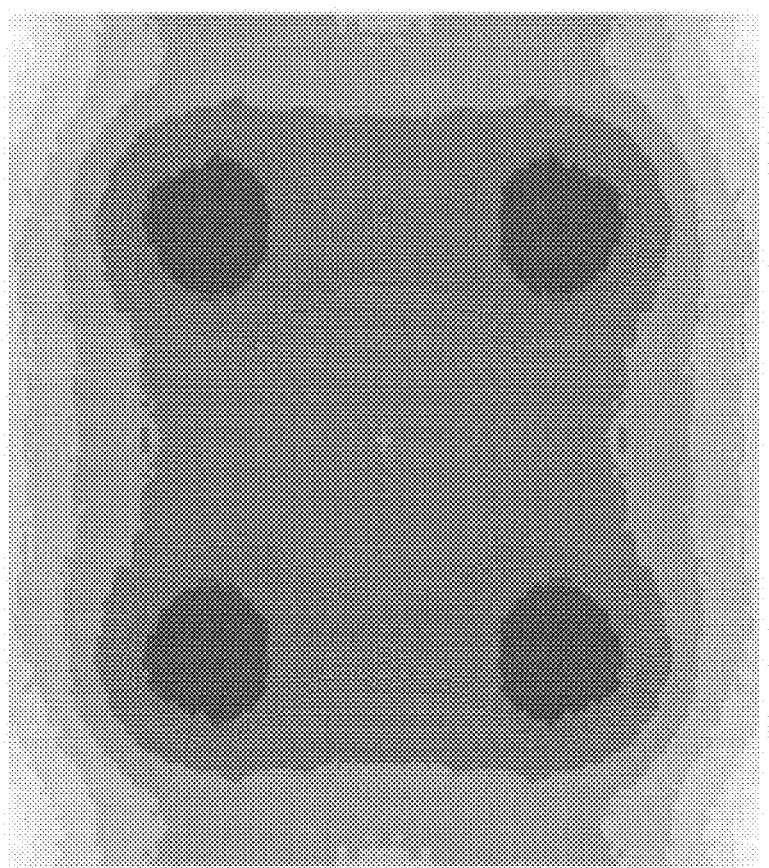
FIG. 11 is a diagram of a light diffusing structure according to the second embodiment.
Figure 12:
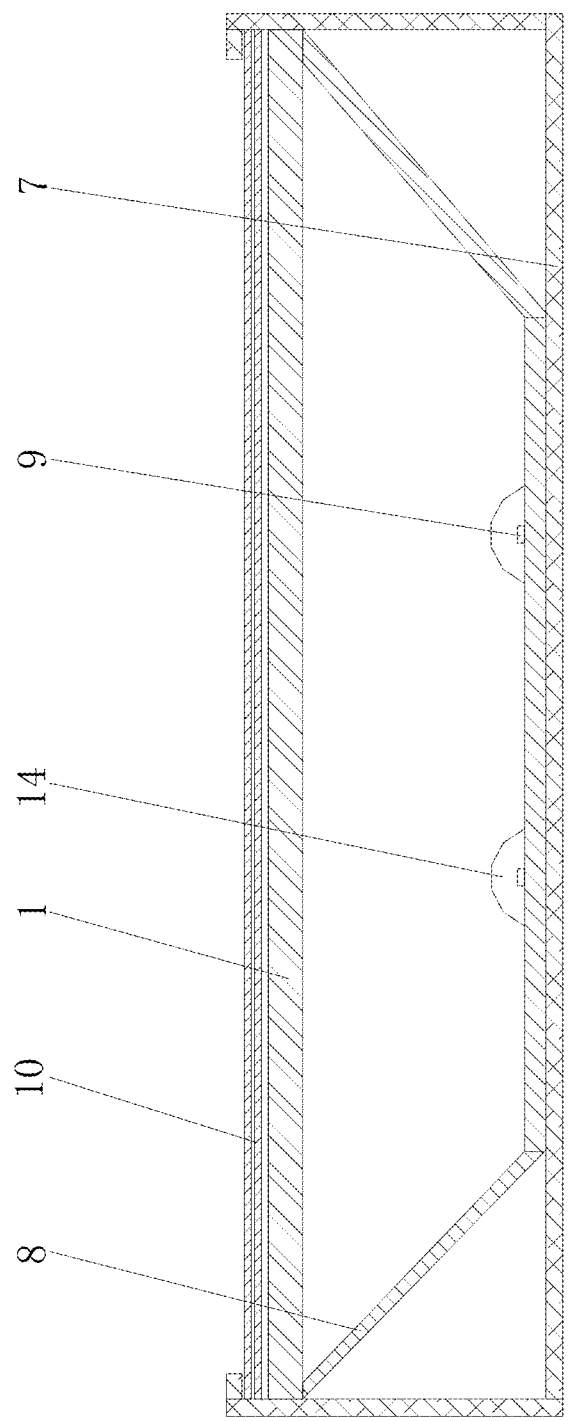
FIG. 12 is a diagram of a backlight module.

The first embodiment of the present invention explains as follows. Please refer to FIG. 1 to FIG. 5 and FIG. 7 to FIG. 12. The diffusing plate structure 1 (as shown in FIG. 12) of the present invention is corresponding to a light source 2 (refer to a light source 2 with matrix structure as shown in FIG. 7 in which the light source 2 includes LEDs arranged as a matrix). The diffusing plate structure 1 comprises an incidence surface 11, an emergence surface 12, a side surface 13, and a light diffusing structure 3 (as shown in FIG. 5). The incidence surface 11 is opposite to the emergence surface 12. The light source 2 is adjacent to a side of the incidence surface 11. The light diffusing structure 3 is disposed on at least one of the incidence surface 11 and the emergence surface 12. The light diffusing structure 3 has rotational symmetry relative to the light source 2. The light diffusing structure 3 includes a plurality of unit blocks distributed evenly. Every unit block includes a first micro diffusing structure 4 (as shown in FIG. 2) or a second micro diffusing structure 5 (as shown in FIG. 3). The first micro diffusing structure 4 includes a first transparent area 41 for transmitting light and a first opaque area 42 for reflecting and diffusing light. The first opaque area 42 surrounds the first transparent area 41. The second micro diffusing structure 5 includes a second transparent area 51 for transmitting light and a second opaque area 52 for reflecting and diffusing light. The second transparent area 51 surrounds the second opaque area 52.

The light diffusing structure 3 is distributed in a manner according to following explanation. A density of the unit block (refer to the first and the second micro diffusing structures 4, 5 as shown in FIG. 2 and FIG. 3, and also refer to FIG. 4) is d. The density means a degree with regard to how many light rays can be blocked by the unit block. An area of the unit block is S. A predetermined threshold is f, where $0<f\leq1$. When d of a unit block is greater than f, the first micro diffusing structure 4 is disposed on the unit block, an area of the first transparent area 41 is S1, and $d=(S-S1)/S$. When d of a unit block is less than f, the second micro diffusing structure 5 is disposed on the unit block, an area of the second opaque area 52 is S2, and $d=S2/S$. According to the manner aforementioned, sizes and arrangements of the first transparent area 41, the first opaque area 42, the second transparent area 51, and the second opaque area 52 of the first and the second micro diffusing structures 4, 5 respectively disposed on the unit blocks can be derived.

The unit blocks are disposed on at least one of the incidence surface 11 and the emergence surface 12 and are adjacent to each other. A shape of the unit block can be square, rectangular, triangle, parallelogram, trapezoid, or hexagon. A material of the diffusing plate structure 1 can be polyethylene terephthalate (PET), polycarbonate (PC), polymethyl acrylate (PMAA), polystyrene (PS), or acrylic. A thickness of the diffusing plate structure 1 is 0.5-3 mm, a transmittance of the diffusing plate structure 1 is 40-80%, and a haze of the diffusing plate structure 1 is greater than 60%.

For example, the light source 2 of the first embodiment is a single LED, and the shape of the unit block of the first embodiment is square. Wherein, the first micro diffusing structure 4 is as shown in FIG. 2, and the second micro diffusing structure 5 is as shown in FIG. 3. Every unit block is set according to the density thereof to construct the light diffusing structure 3 of the first embodiment.

Figure 4:
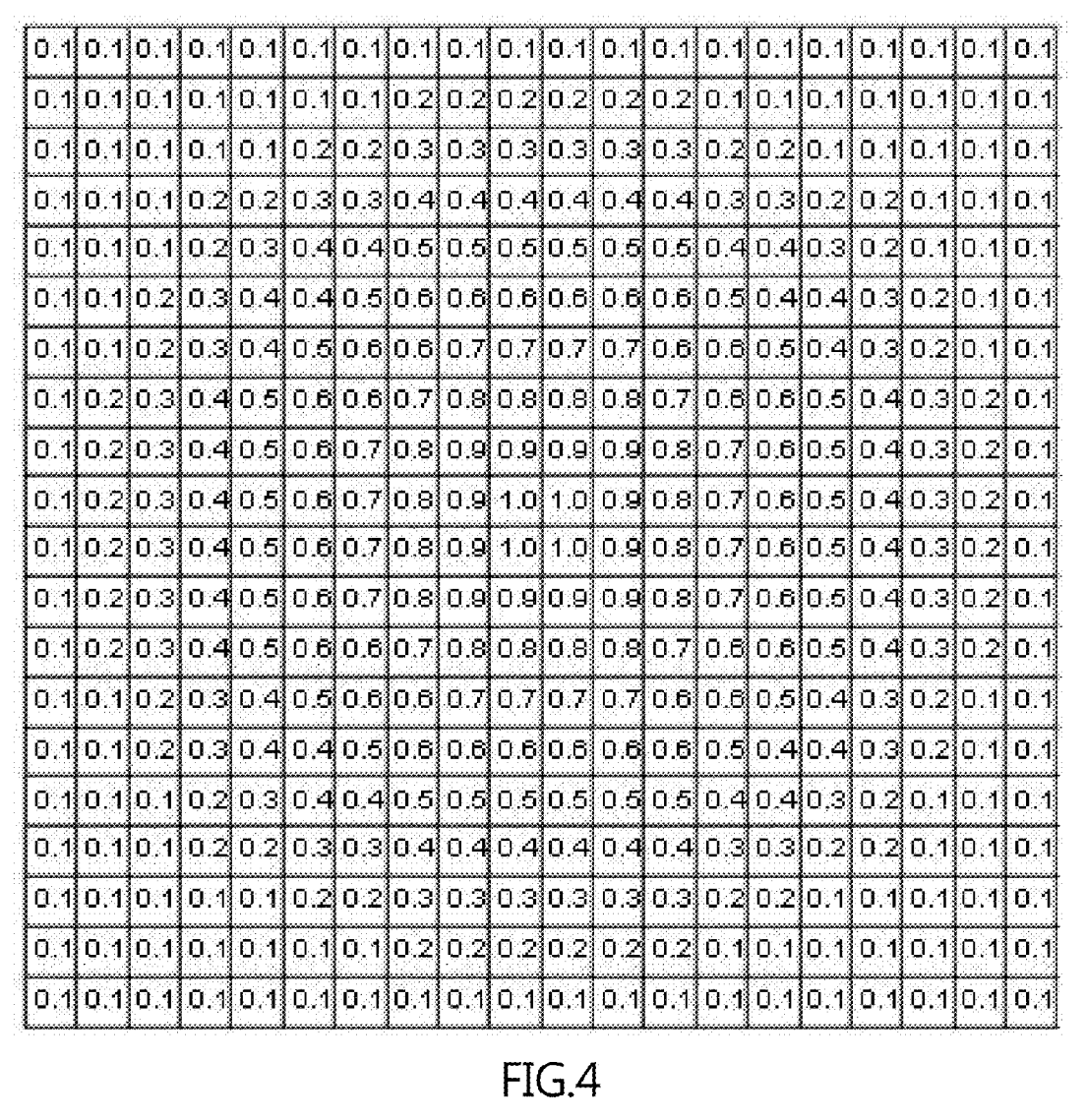

As shown in FIG. 4, the type of light spot of the light source 2 is Lambertian distribution because of the characteristic of LED. An area right above the light source 2 is the brightest area. Brightness of an outside area outside the brightest area gradually becomes lower along with a distance from the brightest area to the outside area becomes longer. The densities of the unit blocks (i.e. the densities of the first or the second micro diffusing structures 4, 5) right above the light source 2 are set relatively greater, which means the degree with regard to how many light rays be blocked by the unit blocks is relatively higher, and the first micro diffusing structures 4 should be disposed on the unit blocks with greater densities. The densities of the unit blocks outside the brightest area which is right above the light source 2 are set relatively lower, and the second micro diffusing structures 5 should be disposed on the unit blocks outside the brightest area with lower densities. The light diffusing structure 3 includes 20×20 unit blocks. The distribution of the densities of the first and the second micro diffusing structures 4, 5 have rotational symmetry relative to the light source 2. The densities of the unit blocks that have same distances from the light source 2 to the unit blocks should be set same values. Wherein, the predetermined threshold f is 0.5. The light diffusing structure 3 as shown in FIG. 5 is patterned by the first and the second micro diffusing structures 4, 5 according to the density distribution matrix as shown in FIG. 4.

Figure 6:
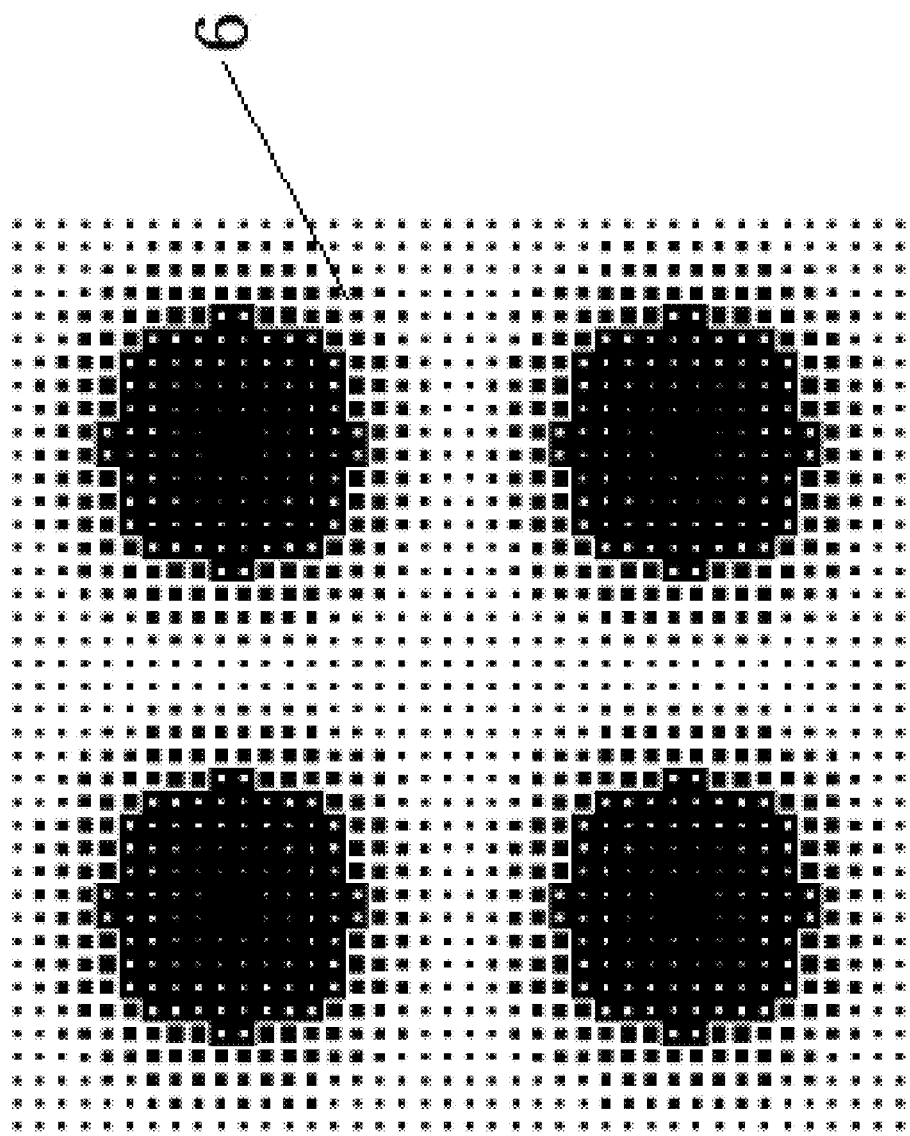
FIG. 6 is a diagram of a light diffusing structure corresponding to a plurality of light sources arranged as a matrix.

When number of light sources 2 are plurality, and the light sources 2 are arranged as a matrix, a matrix light diffusing structure 6 corresponding to the light sources 2 is shown in FIG. 6. The light sources 2 are as shown in FIG. 7. The matrix light diffusing structure 6 is corresponding to a part of the light sources 2 (e.g. the four LEDs enclosed at lower left corner of FIG. 7). The matrix light diffusing structure 6 includes a plurality of the light diffusing structure 3 which are respectively corresponding to the four LEDs in the light sources 2.

The second embodiment of the present invention explains as follows. The invention further discloses another diffusing plate structure 1 corresponding to the light source 2. The diffusing plate structure 1 comprises an incidence surface 11, an emergence surface 12, a side surface 13, and a light diffusing structure 3. The incidence surface 11 is opposite to the emergence surface 12. The light source 2 is adjacent to a side of the incidence surface 11. The light diffusing structure 3 is disposed on at least one of the incidence surface 11 and the emergence surface 12. The light diffusing structure 3 includes a plurality of unit blocks distributed evenly. Every unit block includes a first micro diffusing structure 4 or a second micro diffusing structure 5. The first micro diffusing structure 4 includes a first transparent area 41 for transmitting light and a first opaque area 42 for reflecting and diffusing light. The first opaque area 42 surrounds the first transparent area 41. The second micro diffusing structure 5 includes a second transparent area 51 for transmitting light and a second opaque area 52 for reflecting and diffusing light. The second transparent area 51 surrounds the second opaque area 52. Wherein the light diffusing structure 3 is an asymmetry structure and distributed in a manner according to following steps:
1) deriving an initial matrix with regard to an initial brightness distribution image recorded by a camera when the light source 2 illuminates the diffusing plate structure 1;
2) defining a target matrix with regard to a target brightness distribution image;
3) deriving a density distribution matrix with regard to the light diffusing structure 3 by combining the initial matrix and the target matrix;
4) defining d representing a density of the unit block, S representing an area of the unit block, f representing a predetermined threshold, and $0<f\leq1$, wherein, when d is greater than f, the first micro diffusing structure 4 is disposed on the unit block, an area of the first transparent area 41 is S1, and $d=(S-S1)/S$; when d is less than f, the second micro diffusing structure 5 is disposed on the unit block, an area of the second opaque area 52 is S2, and $d=S2/S$; and
5) patterning the first and the second micro diffusing structures 4, 5 according to the density distribution matrix in accordance with step 3 and settings with regard to the first and the second micro diffusing structures 4, 5 in accordance with step 4.

The light source 2 utilized in a direct type backlight module usually adopts a plurality of LEDs. Light spots emitted from every two adjacent LEDs are interfered with each other to cause that the distribution of the brightness is not symmetry respectively relative to the LEDs and is partially uneven.

Figure 8:
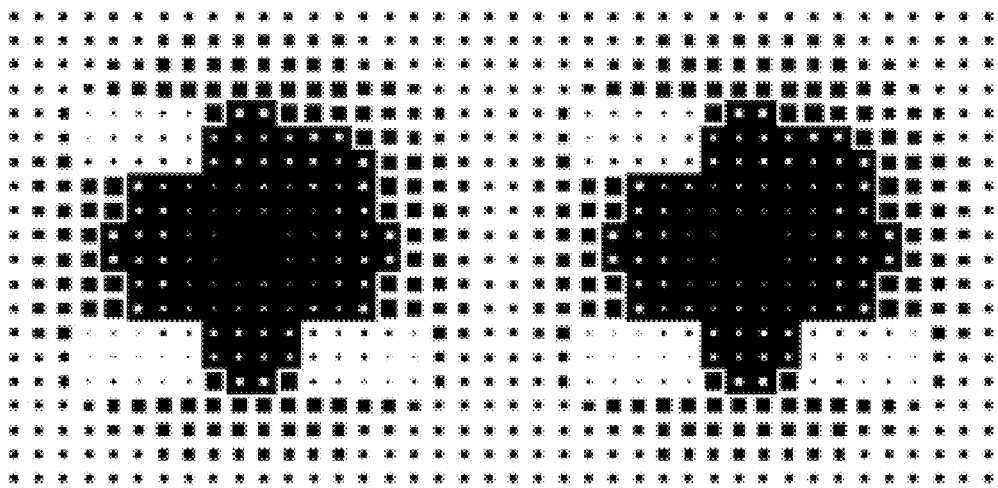
FIG. 8 is a diagram of a light diffusing structure which has been adjusted according to partial shadows projected on the diffusing plate structure.

According to the diffusing plate structure 1 of the second embodiment, densities of the first and the second micro diffusing structures 4, 5 corresponding to areas with uneven brightness distribution phenomenon can be adjusted. For example, if the light diffusing structure 3 as shown in FIG. 5 has three shadows respectively locating at upper left corner, lower left corner, and lower right corner thereon, densities of the first and the second micro diffusing structures 4, 5 corresponding to locations of the shadow will be decreased. Then the adjusted light diffusing structure 3 as shown in FIG. 8 can overcome the shortage of the uneven brightness distribution phenomenon.

The setting process of the light diffusing structure 3 of the second embodiment according to the diffusing plate structure 1 corresponding to the light source 2 adopting four LEDs is described as follows.

Figure 9:
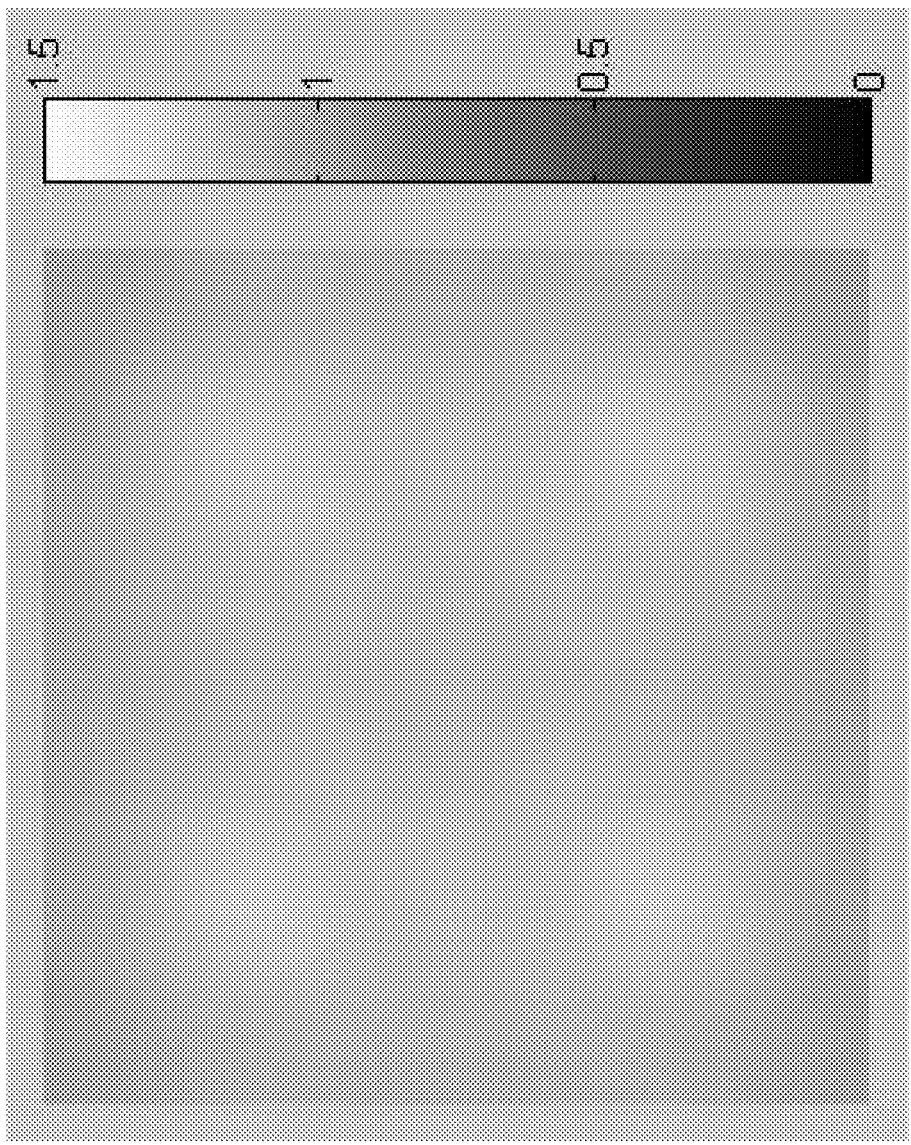
FIG. 9 is a diagram of an initial brightness distribution image of a diffusing plate structure according to a second embodiment of the present invention.

First, an initial matrix with regard to an initial brightness distribution image recorded by a camera when the light source 2 illuminates the diffusing plate structure 1 is derived as shown in FIG. 9. A resolution of the initial matrix of the embodiment is 256×256 pixels. The backlight module as shown includes four LEDs. Locations of the four LEDs can be easily distinguished as shown in FIG. 9 because of the uneven brightness distribution phenomenon.

Figure 10:
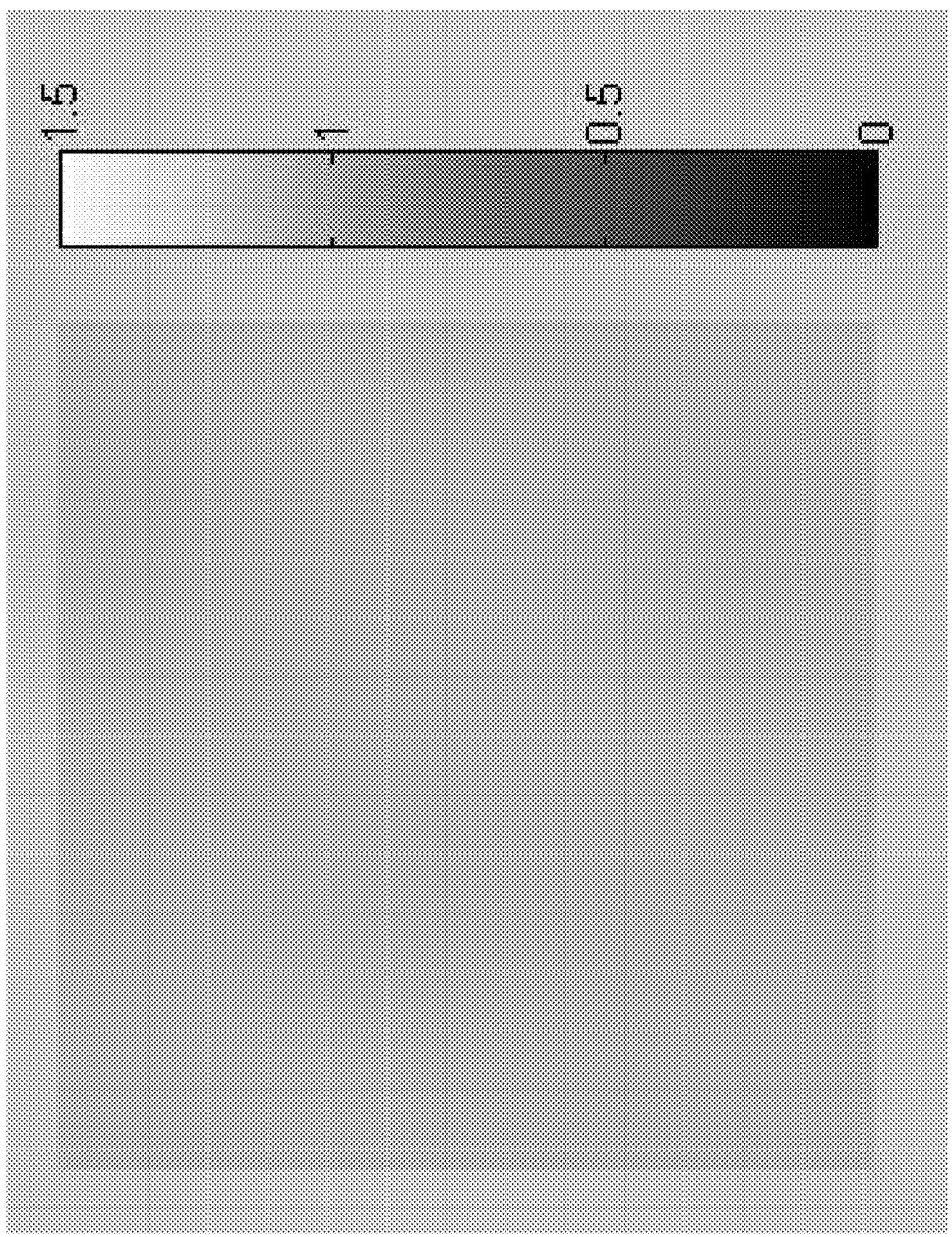
FIG. 10 is a diagram of a target brightness distribution image of the diffusing plate structure according to the second embodiment.

Second, a target matrix with regard to a target brightness distribution image as shown in FIG. 10 is defined. The target matrix may be a Gaussian distribution.

Then, a density distribution matrix with regard to the first and the second micro diffusing structures 4, 5 of the light diffusing structure 3 is derived according to the initial matrix and the target matrix.

Further, according to the manner with regard to set the first and the second micro diffusing structures 4, 5 to the unit blocks, d represents the density of the unit block, S represents the area of the unit block, f represents the predetermined threshold, and $0<f\le 1$. When d is greater than f, the first micro diffusing structure 4 is disposed on the unit block, the area of the first transparent area 41 is S1, and d=(S−S1)/S. When d is less than f, the second micro diffusing structure 5 is disposed on the unit block, the area of the second opaque area 52 is S2, and d=S2/S. Finally, the first and the second micro diffusing structures 4, 5 are patterned as shown in FIG. 11.

The invention further discloses a backlight module as shown in FIG. 12. The backlight module comprises a containing device 7, a reflecting device 8, a lighting device 9, and at least one optical film 10. The reflecting device 8, the lighting device 9, and the optical film 10 are positioned in the containing device 7. The lighting device 9 locates between the reflecting device 8 and the optical film 10. The diffusing plate structure 1 is adjacent to the optical film 10. The containing device 7 is also utilized for containing other components of the backlight module. The reflecting device 8 is utilized for reflecting and reusing light rays which are projected to the periphery and the bottom of the containing device 7. The lighting device 9 is arranged as a matrix or a staggered pattern. The lighting device 9 can be arranged with a secondary optical components 14 (e.g. an optical lens) to increase the ability of light diffusing. The lighting device 9 can further adopt LEDs in accordance with the first and the second embodiments. The optical film 10 can be a diffusing plate or a prism plate to increase the brightness of the backlight module and the uniformity of light mixing. The light diffusing structure 3 can be further disposed on any kind of optical films 10 to increase the brightness of the backlight module and the uniformity of light mixing. The diffusing plate structure 1 can be implemented in accordance with the first and the second embodiments. The light diffusing structure 3 is disposed on the diffusing plate structure 1. In another embodiment, the light diffusing structure can be disposed on at least one of the optical films in the backlight module to increase the brightness of the backlight module and the uniformity of light mixing.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A diffusing plate structure corresponding to a light source, comprising:
    an incidence surface, an emergence surface, and a side surface, the incidence surface being opposite to the emergence surface, the light source being adjacent to a side of the incidence surface; and
    a light diffusing structure disposed on at least one of the incidence surface and the emergence surface, having rotational symmetry relative to the light source, and including a plurality of unit blocks distributed evenly, every unit block including a first micro diffusing structure or a second micro diffusing structure,
    wherein the first micro diffusing structure includes a first transparent area for transmitting light and a first opaque area for reflecting and diffusing light, the first opaque area surrounds the first transparent area, the second micro diffusing structure includes a second transparent area for transmitting light and a second opaque area for reflecting and diffusing light, and the second transparent area surrounds the second opaque area; wherein a density of the unit block is d, an ear of the unit block is S, and a predetermined threshold is f where $0<f\le 1$; and wherein when d is greater than f, the first micro diffusion structure is disposed on the unit black, an area of the first transparent area is S1, and d=(S−S1)/S; when d is less than f, the second micro diffusing structure is disposed on the unit block, an area of the second opaque area is S2, and d=S2/S.

2. The diffusing plate structure of claim 1, wherein the predetermined threshold f is 0.5.

3. The diffusing plate structure of claim 1, wherein the unit blocks are adjacent to each other.

4. The diffusing plate structure of claim 1, wherein a shape of the unit block is square, rectangular, triangle, parallelogram, trapezoid, or hexagon.

5. The diffusing plate structure of claim 1, wherein a material of the diffusing plate structure is polyethylene terephthalate, polycarbonate, polymethyl acrylate, polystyrene, or acrylic.

6. The diffusing plate structure of claim 1, wherein a thickness of the diffusing plate structure is 0.5-3 mm, a transmittance of the diffusing plate structure is 40-80%, and a haze of the diffusing plate structure is greater than 60%.

7. A backlight module applied with the diffusing plate structure of claim 1, wherein the backlight module comprises a containing device, a reflecting device, a lighting device, and at least one optical film, the reflecting device, the lighting device, and the optical film are positioned in the containing device, the lighting device locates between the reflecting device and the optical film, the diffusing plate structure is adjacent to the optical film.

8. A diffusing plate structure corresponding to a light source, comprising:
- an incidence surface, an emergence surface, and a side surface, the incidence surface being opposite to the emergence surface, the light source being adjacent to a side of the incidence surface; and
- a light diffusing structure disposed on at least one of the incidence surface and the emergence surface, and including a plurality of unit blocks distributed evenly, every unit block including a first micro diffusing structure or a second micro diffusing structure,
- wherein the first micro diffusing structure includes a first transparent area for transmitting light and a first opaque area for reflecting and diffusing light, the first opaque area surrounds the first transparent area, the second micro diffusing structure includes a second transparent area for transmitting light and a second opaque area for reflecting and diffusing light, and the second transparent area surrounds the second opaque area; and
- wherein the light diffusing structure is an asymmetry structure and distributed in a manner according to following steps:
  1) deriving an initial matrix with regard to an initial brightness distribution image recorded by a camera when the light source illuminates the diffusing plate structure;
  2) defining a target matrix with regard to a target brightness distribution image;
  3) deriving a density distribution matrix with regard to the light diffusing structure according to the initial matrix and the target matrix;
  4) defining d representing a density of the unit block, S representing an area of the unit block, f representing a predetermined threshold, and $0 < f \leq 1$, wherein when d is greater than f, the first micro diffusing structure is disposed on the unit block, an area of the first transparent area is S1, and $d=(S-S1)/S$; when d is less than f, the second micro diffusing structure is disposed on the unit block, an area of the second opaque area is S2, and $d=S2/S$; and
  5) patterning the first and the second micro diffusing structures by combining the density distribution matrix in accordance with step 3 and settings with regard to the first and the second micro diffusing structures in accordance with step 4.

9. The diffusing plate structure of claim 8, wherein the predetermined threshold f is 0.5.

10. The diffusing plate structure of claim 8, wherein the unit blocks are adjacent to each other.

11. The diffusing plate structure of claim 8, wherein a shape of the unit block is square, rectangular, triangle, parallelogram, trapezoid, or hexagon.

12. The diffusing plate structure of claim 8, wherein a material of the diffusing plate structure is polyethylene terephthalate, polycarbonate, polymethyl acrylate, polystyrene, or acrylic.

13. The diffusing plate structure of claim 8, wherein a thickness of the diffusing plate structure is 0.5-3 mm, a transmittance of the diffusing plate structure is 40-80%, and a haze of the diffusing plate structure is greater than 60%.

14. A backlight module applied with the diffusing plate structure of claim 8, wherein the backlight module comprises a containing device, a reflecting device, a lighting device, and at least one optical film, the reflecting device, the lighting device, and the optical film are positioned in the containing device, the lighting device locates between the reflecting device and the optical film, the diffusing plate structure is adjacent to the optical film.

* * * * *